H. O. JACKSON.
OSCILLATING PRESSURE BLOWER.
APPLICATION FILED MAY 18, 1916.
1,243,299.
Patented Oct. 16, 1917.
5 SHEETS—SHEET 5.
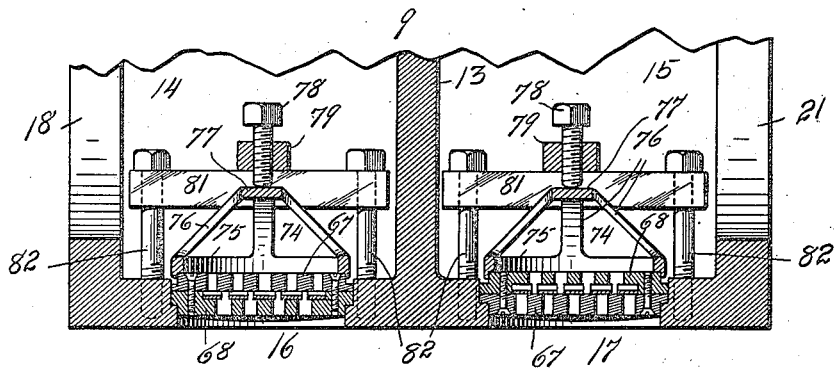
Fig. 6.
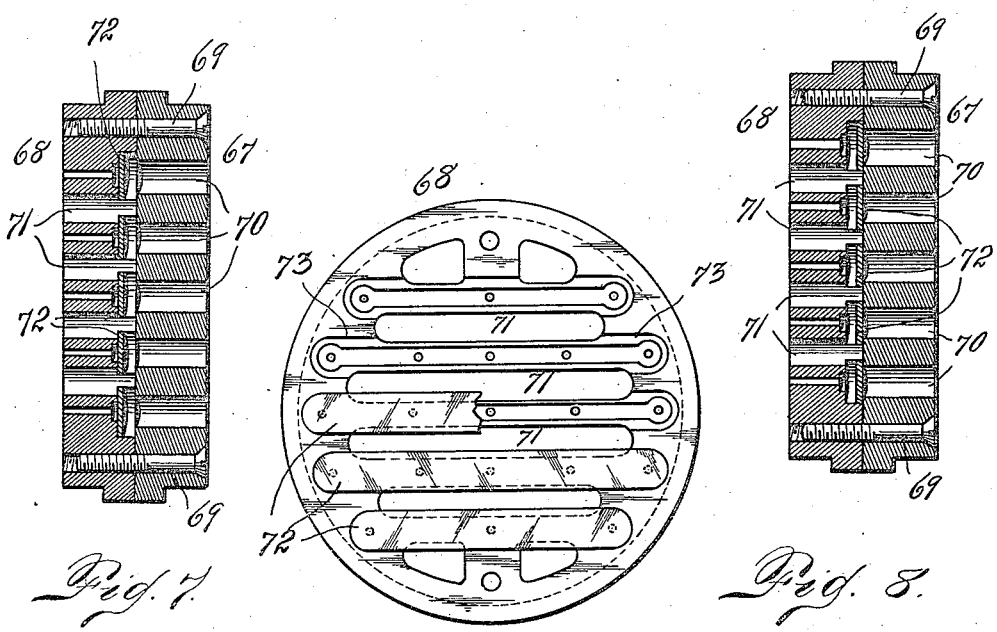
Fig. 7.   Fig. 8.
Fig. 9.
Witness
Otto E. Hoddick
John B. Dade
Inventor
H. O. Jackson
By [signature]
Attorney

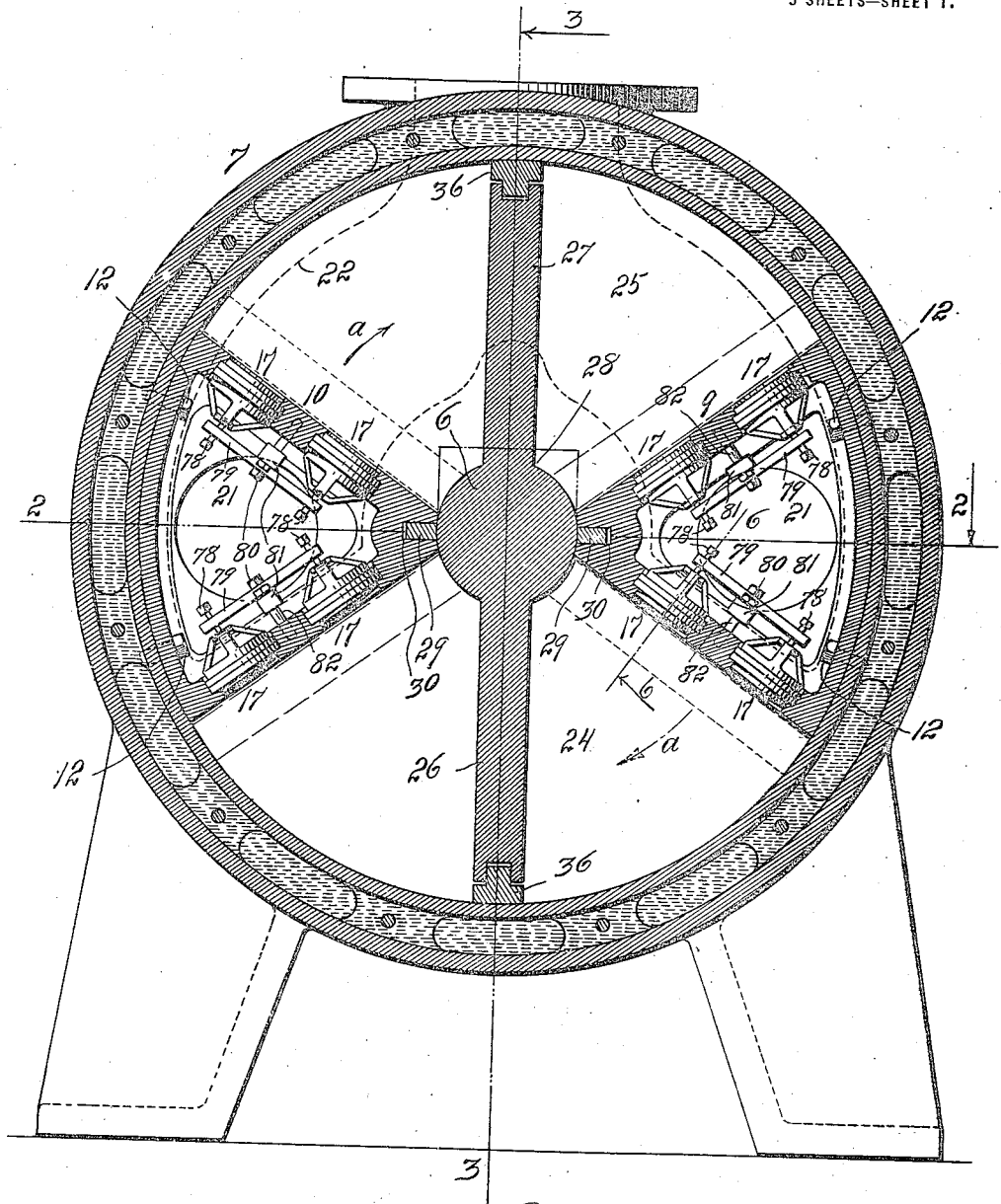

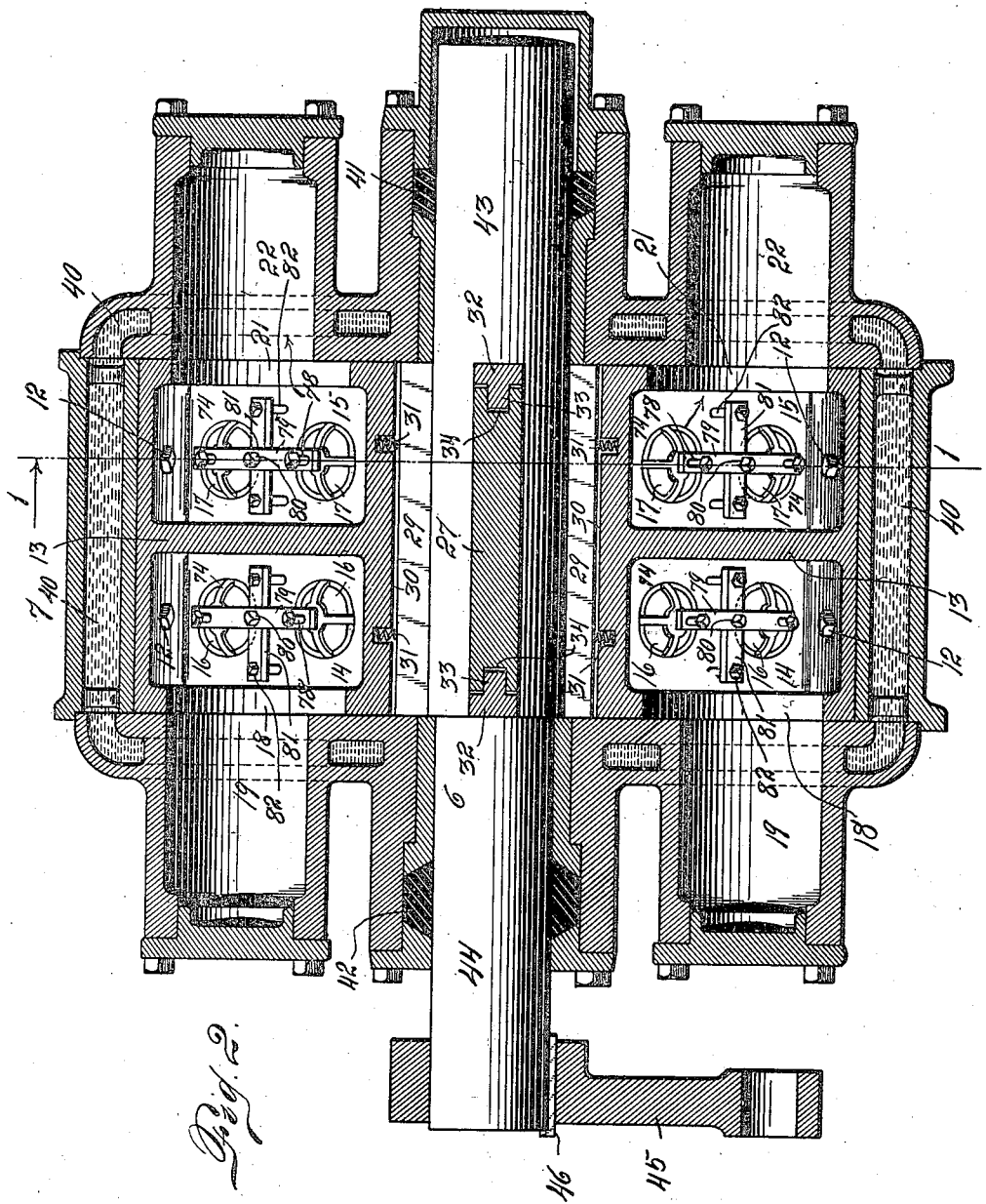

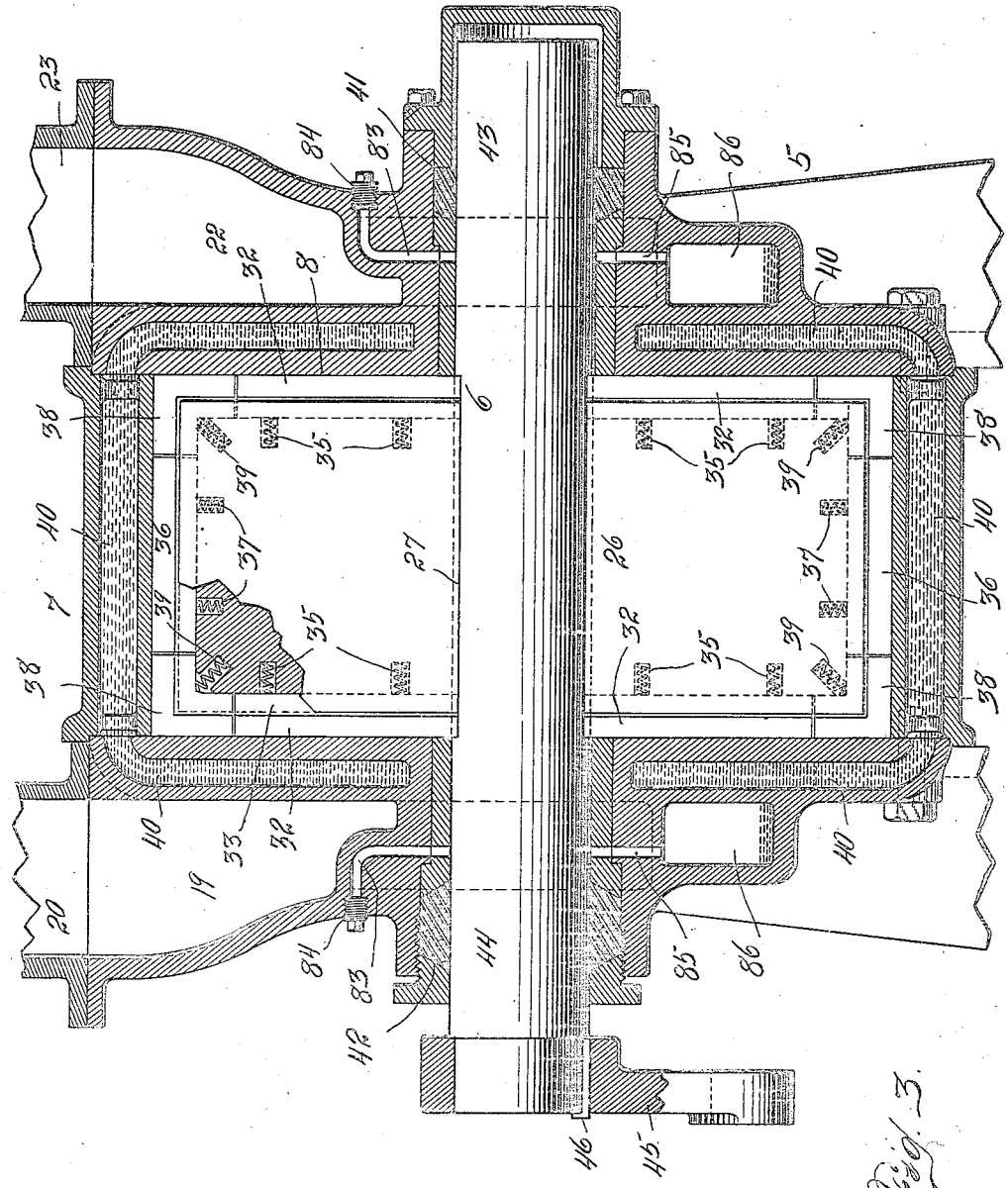

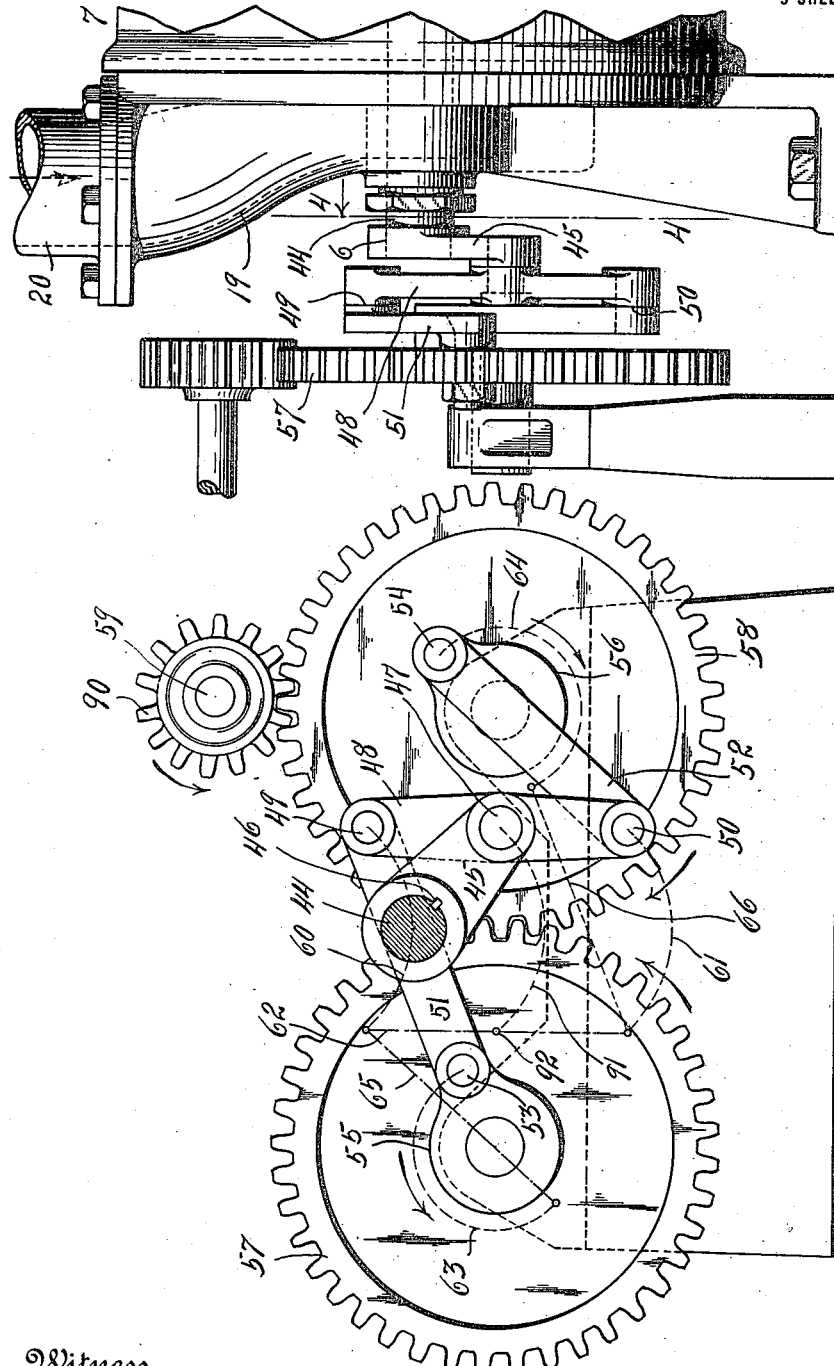

UNITED STATES PATENT OFFICE.

HENRY O. JACKSON, OF DENVER, COLORADO.

OSCILLATING PRESSURE-BLOWER.

1,243,299.   Specification of Letters Patent.   Patented Oct. 16, 1917.

Application filed May 18, 1916. Serial No. 98,297.

*To all whom it may concern:*

Be it known that I, HENRY O. JACKSON, a citizen of the United States, residing at the city and county of Denver and State of Colorado, have invented certain new and useful Improvements in Oscillating Pressure-Blowers; and I do declare the following to be a full, clear and exact description of the invention, such as will enable others skilled in the art to which it appertains to make and use the same, reference being had to the accompanying drawings, and to the characters of reference marked thereon, which form a part of this specification.

My invention relates to improvements in blowers or air forcing apparatus of the character in which an oscillating blade or piston serves to perform the air forcing function. My object is to provide a device of this character which shall be comparatively simple in construction and which shall efficiently perform its function. My further object is to provide a construction of this class which shall be of large capacity, and therefore well adapted for use in ventilating large buildings and mines; also to furnish currents of warmed, cooled, moistened or medicated air to public buildings or others which are liable to be closely occupied; to furnish drying atmosphere in lumber or grain kilns and in all other relations where air currents in relatively large volumes are required.

In my improved construction I employ a casing whose body portion is cylindrical in shape, and which is equipped with two sector-shaped hollow members, the chambers of each being separated into two compartments by a centrally disposed partition, each compartment being equipped with four check valves, those of one being inwardly opening and those of the other outwardly opening, whereby two of the valves of each outwardly opening set may be simultaneously employed for the entrance of air to the corresponding piston chamber compartments, while two valves of each inwardly opening set are employed for the exit of air from the piston chamber compartments. One compartment of each hollow member is always employed for receiving air from an inlet conduit while the other is always employed for the discharge of air to an outlet conduit. From this it will be understood that one pair of check valves of each compartment is always idle during the movement of the corresponding blade or piston member in one direction, since both valves of one pair are closed. These same valves, however, open during the movement of the piston blade or member in the opposite direction for the ejection of air from the piston chamber or compartment into the corresponding exit chamber or compartment of a sector-shaped member.

Any suitable mechanism may be employed for imparting the oscillating movement to the blade or piston.

Having briefly outlined my improved construction, I will proceed to describe the same in detail, reference being made to the accompanying drawing, in which is illustrated an embodiment thereof. In this drawing,—

Figure 1 is a cross section taken through my improved pressure blower, cutting the same at right angles to the axis of the cylindrical body member, and, consequently, at right angles to the axis of oscillation of the operating blade or piston. The plane of this section is indicated by the line 1—1, Fig. 2, the view being obtained by looking toward the right.

Fig. 2 is a longitudinal section taken on the line 2—2, Fig. 1, looking downwardly. This view is a central section except that it is taken just above the shaft member of the oscillating piston.

Fig. 3 is a section taken at right angles to Fig. 2, the plane of the section being indicated by the line 3—3, Fig. 1.

Fig. 4 is a section taken through the operating shaft outside of the body of the structure, the plane of the section being indicated by the line 4—4, Fig. 5. This view is obtained by looking toward the left and shows the specific mechanism for imparting the oscillating movement to the piston.

Fig. 5 is an elevation of the operating mechanism, including a fragment of the main structure, the view being taken by looking in the direction of arrow 5, Fig. 4.

Fig. 6 is a section taken on the line 6—6, Fig. 1, the parts being shown on a larger scale.

Figs. 7, 8 and 9 are views illustrating a specific construction of check valves, which I prefer to employ in connection with my improved oscillating blower.

The same reference characters indicate the same parts in all the views.

Let the numeral 5 designate a suitable frame-work in which is journaled an operating shaft 6 which passes centrally through a cylindrical casing 7 inclosing a chamber 8 in which are located and secured to hollow sector-shaped members which I will designate by the numerals 9 and 10 respectively, the difference in designation, however, being for convenience only, since the two structures are substantially identical. As shown in the drawing, the two members 9 and 10 are secured to the cylindrical wall of the casing by means of stud bolts 12 which are passed through the outer curved portions of the members and threaded into the wall of the casing. Each of these sector-shaped members has a central partition 13 which is cast integral with the member and separates the chamber of the member into what I will term inlet and outlet compartments designated by the numerals 14 and 15 respectively, since the air enters the compartment 14 from the atmosphere for instance, and is discharged from the other compartment as it leaves the blower. Each sector-shaped member is equipped with eight check valves, there being four for each compartment. All of the check valves of each outlet compartment, namely, those designated by the numeral 17, open inwardly into the compartment 15 from the adjacent piston chamber compartment; while all of the valves of each inlet compartment, namely, those designated 16, open into the piston chamber compartments, whereby air is allowed to enter said compartments. Each inlet compartment of the two sector-shaped members is in communication by an opening 18 and a chamber 19 with an inlet conduit 20; while the outlet compartments 15 of the two sector-shaped members are in communication by way of openings 21 and chambers 22 with an outlet conduit 23.

The two sector-shaped members are diametrically located as best illustrated in Fig. 1, and divide the casing chamber into two compartments designated 24 and 25 respectively, in which are located and arranged to oscillate, the two blade members 26 and 27 extending radially from the centrally located shaft 6 which is journaled in the casing 5 of the structure, as heretofore explained. The shaft 6 may be actuated by any suitable mechanism and by any suitable power, whereby partial rotations are imparted to it in reverse directions at properly timed intervals. If it be assumed that the piston 28 occupies the position shown by dotted lines in Fig. 1, it is at one of its extreme positions and its members 26 and 27 have just expelled a charge of air from the adjacent piston compartments, through the inwardly opening check valves 17 of the two compartments 15 of the two members 9 and 10, and have drawn charges of air into the two compartments 24 and 25 of the casing chamber, through the outwardly opening check valves 16 of the two members 9 and 10. Now, as the piston begins its movement in the direction of the arrows $a$ (see Fig. 1), its member 26 immediately begins to expel the air from the compartment 24 through the check valves 17 into the compartment 15 of the member 10 and to draw a charge of air into the compartment 24 of the casing chamber through the outwardly opening check valves 16 of the member 9; while the blade 27 of the piston during the same time, begins to expel the charge of air from the chamber compartment 25 through the check valves 17 of the member 9, and draw a charge of air into the chamber compartment 25 through the outwardly opening check valves 16 of the member 10, and this operation is repeated so long as the machine is in motion. It will thus be understood that both the construction and the operation of the mechanism are comparatively simple. Provision is made for forming tight joints between the shaft and the members 9 and 10 by the employment of packing strips 29 which are movable in recesses 30 formed in the inner extremities of the said members and are forced inwardly against the oscillating shaft by means of spiral springs 31. Furthermore, the oscillating piston 28 is equipped at its opposite sides with packing strips 32 having tongues 33 which enter grooves 34 formed in the blade members 26 and 27. The tongues of these packing strips are acted on to force the strips outwardly against the adjacent walls of the casing, by spiral springs 35; while the ends of this piston are equipped with similar packing strips 36 which are acted on by spiral springs 37. The blade members of the piston are further provided with corner packing pieces 38 which are angle-shaped and are forced outwardly into the corners of the casing chamber by means of spiral springs 39.

The walls of the casing 7 are chambered as shown at 40 whereby jackets are formed through which water circulates for cooling purposes, the same being supplied from any suitable source (not shown). The journal extremities 43 and 44 of the shaft 6, pass through stuffing boxes 41 and 42 with which the structure is equipped, whereby the escape of fluid around the journals, is prevented.

The oscillating piston is actuated for the purpose of performing its function through the medium of suitable mechanism, one form of which is illustrated in Figs. 4 and 5. A crank 45 is keyed as shown at 46 to the exposed extremity of the journal 44 of the shaft 6. This crank arm is connected by means of a wrist pin 47 with the center of a floating equalizing bar 48 whose opposite extremities are connected by means of wrist pins 49 and 50 with two links 51 and 52, the opposite extremities of these links being connected by means of wrist pins 53 and 54 with cranks 55 and 56 respectively secured to two meshing gears 57 and 58. Power may be applied to either of these gears from a power shaft 59 upon which is secured a gear or pinion 90 which, as shown in the drawing, meshes with the gear 58.

If it be assumed that the operating mechanism is in the position shown in Fig. 4, and the operating pinion is rotated in the direction of the arrow adjacent said pinion, the two gears 57 and 58 will be rotated in the directions indicated by the arrows adjacent said gears, and, if it be assumed that the piston is in the position shown by dotted lines in Fig. 1 at the beginning of the operation, the axes of the two wrist pins 49 and 50 will move in the dotted arcs 60 and 61, until the equalizing bar 48 is in the position indicated by the broken line 62. During this same time the axes of the two wrist pins 53 and 54 will have traversed paths indicated by the dotted arcs 63 and 64, and the longitudinal centers of the two links 51 and 52 will be in the positions respectively indicated by the broken lines 65 and 66. At the same time the axis of the wrist pin 47 which connects the crank 45 with the equalizing bar, will have traversed a dotted arc 91 and the piston will have made one complete stroke, during which it may be said to have moved from the position shown by dotted lines in Fig. 1 to the position shown by broken lines in the same figure. Then, as the rotation of the two gears 57 and 58 continues in the same direction, the parts of the actuating mechanism just referred to, will begin to traverse the aforesaid dotted arcs in the reverse direction, and by the time the operating devices have again reached the full line positions in Fig. 4, the oscillating piston will have made its reverse stroke or moved from the broken line position in Fig. 1 to the dotted line position in the same figure; and this operation is repeated as the motion of the operating mechanism continues.

By reference to Fig. 6, it will be understood that one of the valves 16 and one of the valves 17 of the sector-shaped member 9, is illustrated. Assuming that the blade member 26 of the piston is moving from the dotted line position in Fig. 1 as indicated by the arrow, the air is entering the chamber compartment 24 through the valves 16 of the member 9, while the valves 17 of the same member are closed. As illustrated in the drawing, the mechanism for the check valves disclosed in Figs. 6 to 9 inclusive, is that covered by a simultaneously pending application, and consists of two casing members 67 and 68 connected by screws 69, the casing members being respectively equipped with passages 70 and 71 arranged in staggered relation and controlled by relatively long, thin, flat valve pieces 72, the casing member 68 being recessed as shown at 73 to receive the extremities of the valve piece 72, the latter being arranged to move bodily and uniformly throughout their entire length as circumstances may require.

As illustrated in the drawing, it may be assumed that all of the check valves 16 and 17, are of the construction illustrated in Figs. 7, 8 and 9, but it must also be understood that the valves 16 are reversely arranged from the valves 17 of either member 9 or 10. From this it will also be understood that if one of these valves is in position to act as an inlet valve, if its position be reversed it will serve as an outlet valve.

As illustrated in the drawing, each pair of valves 16 as well as each pair 17 of each member 9 or 10, is held in place through the instrumentality of a sort of cage 74 which consists of a ring 75 which is provided with a number of spider arms 76 which merge in a center piece 77 which is engaged by the inner extremity of a screw 78 which is threaded through an opening formed in a piece 79. There is one piece 79 for each pair of these valves, and, consequently, there are two screws 78, one for each valve of the pair with which a piece 79 is employed. The piece 79 is secured in place by means of a center bolt or screw 80 which connects the piece 79 with a cross piece 81 which is connected with the adjacent part of the member 9 or 10 as the case may be, by means of bolts 82. It will thus be noted that the parts 79 and 81, simply constitute a structure through the instrumentality of which the cages 74 are forced against the check valves to hold the latter in place. It is not thought necessary to explain this valve construction more in detail in this specification, since it is not claimed herein.

Provision is made for lubricating the journals 43 and 44 of the shaft 6, since the journal boxes are provided with ducts 83 whose outer extremities are closed by screw plugs 84. These ducts terminate at the top of the journals. Leading downwardly from these journals are other ducts 85 (see Fig. 3) which terminate in receptacles 86 into which the superfluous oil may be drained.

From the foregoing description the use and operation of my improved blower will be readily understood. Assuming that the gear 60 is rotated, rotation is imparted to the two gears 57 and 58 in the directions indicated by the arrows adjacent the lower cogged peripheries of these gears. This action of the gears serves to move the crank 45 first from the position shown in full lines in Fig. 4, toward the left, the axis of the crank pin 47 traveling in the dotted arc 91 as heretofore explained, until the necessary movement has been obtained to impart to the piston 28 one complete stroke, the said piston moving from the dotted line position in Fig. 1 to the broken line position in the same figure. During this operation, the blade member 26 of the piston has expelled a charge of air from the chamber compartment 24 by way of the inwardly opening check valves 17 of the sector-shaped member 10. At the same time the blade member 26 of the piston has drawn a charge of air into the chamber compartment 24 through a pair of outwardly opening check valves 16 of the sector-shaped member 9; and the blade member 27 of the piston has ejected a charge of air through a pair of inwardly opening check valves 17 of the sector-shaped member 9, and has drawn a charge of air into the chamber compartment 25 through a pair of outwardly opening check valves 16 of the sector-shaped member 10. As soon as the crank arm 45 has moved from the full line position in Fig. 4 to the position heretofore explained, that is, until the axis of the crank pin 47 has moved through the dotted arc 91 and reached the point indicated by the small circle 92, and the other parts of the operating mechanism have reached corresponding positions heretofore explained, the travel of the crank pins 49 and 50, being indicated by the dotted arcs 60 and 61, and of the crank pins 53 and 54 by the dotted arcs 63 and 63, and whereby the equalizing bar 48 has reached the position indicated by the broken line 62, and the two links 51 and 52 have reached the positions respectively indicated by the broken lines 65 and 66, the piston 28 has made one complete stroke, namely, from the position shown by dotted lines to the position shown by broken lines in Fig. 1. The crank arm 45 then begins its reverse movement, and the axis of the crank pin 47 traverses the dotted arc 91 in the direction opposite that heretofore explained, whereby the crank arm 45 is returned to the full line position in Fig. 4; and at the same time the other parts of the operating mechanism will have been returned to corresponding positions or those shown by full lines in Fig. 4, and the operating piston 28 will have completed its return stroke, whereby it is returned to the dotted line position in Fig. 1. During this return stroke or reverse movement of the piston 28, charges of air will have been ejected from the chamber compartments 24 and 25 and other charges of air drawn thereinto on the principle heretofore explained. It will be understood that as the crank arm 45 oscillates as heretofore explained, a corresponding movement is imparted to the main shaft 6 upon which the piston is mounted, by virtue of the fact that the crank arm 45 is keyed to the journal 44 of the said shaft.

My improved construction has a great variety of uses, some of which have already been mentioned. It is evident that it may be advantageously employed in the flotation process for ore treatment; in copper converters; in sugar factories; and for all other purposes where high pressures are required.

Having thus described my invention, what I claim is,—

1. In air forcing apparatus the combination of a circumferentially closed cylindrical casing having a detachable head, two sector shaped hollow members oppositely disposed in said casing and dividing the chamber thereof into two compartments, said hollow members having closed walls fitting the adjacent closed areas of the cylindrical wall of the casing, means for removably securing said hollow members in place, each hollow member having a partition dividing its cavity into two compartments one of the latter having an inlet opening for atmospheric air and the other an outlet opening for compressed air, the said inlet and outlet openings of each member being respectively in communication with openings in the heads of the casing, each compartment of each hollow member having ports respectively communicating on opposite sides with the adjacent casing compartments, outwardly opening check valves respectively controlling the ports on the opposite sides of each inlet compartment of each hollow member, inwardly opening check valves respectively controlling the ports on opposite sides of each outlet compartment of each hollow member, and an oscillatory piston having blade members movable in the respective chamber compartments of the cylindrical casing, and coöperating with the hollow members.

2. In air forcing apparatus, the combination of a circumferentially closed cylindrical casing having a detachable head, two substantially sector shaped hollow members oppositely disposed in said casing and dividing the chamber thereof into two substantially equal compartments, said hollow members having closed walls fitting the adjacent closed areas of the cylindrical wall of the casing, means for removably securing said hollow members in place, each hollow member having a partition dividing its cavity into two compartments one of the latter having an inlet opening for atmospheric air and the other an outlet opening for compressed air, the said inlet and outlet openings of each member being respectively in communication with openings in the heads of the casing, each compartment of each hollow member having ports respectively communicating on opposite sides with the adjacent casing compartments, and means for controlling the ports of the inlet compartment of each hollow member to allow the air to escape into the chamber compartment of the casing on the suction side and simultaneously to close the said ports on the compression side, and means for controlling the ports of the outlet compartment of each hollow member to allow the air to enter said compartments on the compression side and to close said compartments on the suction side, an oscillatory piston journaled between the two sector shaped members and having blades projecting into the respective chamber compartments of the casing.

3. In air forcing apparatus the combination of a circumferentially closed cylindrical casing having detachable heads, two substantially sector shaped hollow members oppositely disposed in said casing and dividing the chamber thereof into two substantially equal compartments, said hollow members having closed walls fitting the adjacent closed areas of the cylindrical wall of the casing, means for removably securing the said hollow members in place each hollow member having a partition extending at right angles to the axis of the piston and dividing the hollow member into inlet and outlet compartments, the inlet compartment of each member having an outwardly opening check valve adjacent each chamber compartment of the casing and the outlet compartment of each member having an inwardly opening check valve adjacent each chamber compartment, and an oscillatory piston journaled between the two members and having plates movable in the respective chamber compartments and coöperating with the hollow members.

4. Air forcing apparatus comprising a circumferentially closed cylindrical chamber having removable heads respectively open for the entrance of atmospheric air and the escape of compressed air, substantially sector shaped hollow members oppositely disposed in said chamber and dividing the latter into two substantially equal and oppositely disposed compartments, each hollow member having a closed outer wall curved to engage the inner surface of the adjacent area of the cylindrical chamber, means for detachably securing the hollow members within the chamber, each hollow member having two distinct compartments one being an inlet compartment in communication with the inlet opening in the adjacent head of the chamber and the other being an outlet compartment in communication with the outlet opening in the adjacent head of the chamber, a piston mounted to oscillate in the chamber and having a blade member in each chamber compartment, each compartment of each hollow member having ports adjacent the respective chamber compartments, and means for controlling the ports of the inlet compartments to allow air to pass therefrom into the adjacent chamber compartments, and means for controlling the ports of the outlet compartments of the hollow members to allow the air to pass from the chamber compartments into the hollow member compartments.

5. In air forcing apparatus the combination of a circumferentially closed cylindrical chamber having detachable heads, two oppositely disposed substantially sector shaped members removably secured therein and dividing the chamber into two compartments of substantially equal volume, a piston plate centrally pivoted in the chamber and having a member movable in each compartment, each hollow member having a partition dividing the cavity into two compartments, one being an inlet compartment and the other an outlet compartment, the two compartments of each hollow member being provided with check valve controlled ports to allow the air to pass from the chamber compartments into the outlet compartments of the hollow members, and from the inlet compartments of the hollow members into the chamber compartments as the piston plate is oscillated.

6. Air forcing apparatus including a circumferentially closed cylindrical casing, two substantially sector shaped hollow members oppositely disposed therein and dividing the casing chamber into two compartments, said members each having two compartments and closed walls fitting the adjacent closed areas of the cylindrical wall of the casing, means for removably securing said members in place within the casing, one compartment of each member having inwardly opening check valve controlled ports respectively arranged on opposite sides, and the other compartment of each member having outwardly opening check valve controlled ports respectively arranged on opposite sides, and a piston centrally pivoted to oscillate in the chamber and having blades freely movable in the respective chamber compartments formed by said sector shaped members, and coöperating with the latter, one compartment of each hollow member being in communication with an air inlet and the other compartment in communication with an air outlet.

In testimony whereof I affix my signature in presence of two witnesses.

HENRY O. JACKSON.

Witnesses:
  GRACE HUSTON,
  A. EBERT O'BRIEN.